US012769338B2

(12) United States Patent
Ting

(10) Patent No.: US 12,769,338 B2
(45) Date of Patent: Oct. 20, 2026

(54) DRONE AND OPERATING METHOD THEREOF

(71) Applicant: Wistron Corporation, New Taipei City (TW)

(72) Inventor: Tung Sheng Ting, New Taipei City (TW)

(73) Assignee: Wistron Corporation, New Taipei City (TW)

( * ) Notice: Subject to any disclaimer, the term of this patent is extended or adjusted under 35 U.S.C. 154(b) by 55 days.

(21) Appl. No.: 18/988,916

(22) Filed: Dec. 20, 2024

(65) Prior Publication Data

US 2026/0161186 A1 Jun. 11, 2026

(30) Foreign Application Priority Data

Dec. 6, 2024 (TW) ................................ 113147565

(51) Int. Cl.

*G05D 1/85* (2024.01)
*G05D 1/226* (2024.01)
*G05D 1/248* (2024.01)
*G05D 109/20* (2024.01)
*G05D 111/30* (2024.01)

(52) U.S. Cl.

CPC ............... *G05D 1/85* (2024.01); *G05D 1/226* (2024.01); *G05D 1/248* (2024.01); *G05D 2109/20* (2024.01); *G05D 2111/30* (2024.01)

(58) Field of Classification Search

CPC .......... G05D 1/85; G05D 1/248; G05D 1/226; G05D 2111/30; G05D 2109/20
USPC ............................................................. 701/2
See application file for complete search history.

(56) References Cited

U.S. PATENT DOCUMENTS 9,246,749 B1 1/2016 Nguyen
9,352,834 B2 * 5/2016 Davies .................. G05D 1/102
9,817,396 B1 * 11/2017 Takayama .............. G05D 1/667
11,429,094 B2 * 8/2022 Zhang .................. G05D 1/0022
11,640,178 B2 * 5/2023 Nonami ................. B64U 10/16 701/3
11,661,190 B2 * 5/2023 Stamatovski ............. B64F 3/00 701/14
11,669,054 B2 * 6/2023 Pan ........................ B64D 43/00 701/527

(Continued)

FOREIGN PATENT DOCUMENTS

CN 108622412 10/2018

OTHER PUBLICATIONS

Mustafa Alkhatib et al., "A return-to-home unmanned aerial vehicle navigation solution in global positioning system denied environments via bidirectional long short-term memory reverse flightpath prediction", Engineering Applications of Artificial Intelligence, Nov. 25, 2024, pp. 1-8, vol. 140.

*Primary Examiner* — Luis A Martinez Borrero
(74) *Attorney, Agent, or Firm* — JCIPRNET

(57) ABSTRACT

Provided are a drone and an operating method of the drone. The method includes: a control signal and a positioning signal are received; a first posture of the drone is recorded in a storage medium of the drone when the drone moves; whether the control signal or the positioning signal is lost is determined; the first posture is read from the storage medium, and a second posture opposite to the first posture is obtained in response to losing the control signal and the positioning signal; and the drone is operated to move in the second posture.

19 Claims, 6 Drawing Sheets

(56) References Cited

U.S. PATENT DOCUMENTS

| | | | | |
|---|---|---|---|---|
| 11,673,650 | B2 * | 6/2023 | Greiner | B64C 15/02 244/12.4 |
| 11,702,191 | B1 * | 7/2023 | Depenbusch | B64C 13/0421 701/3 |
| 11,726,502 | B2 * | 8/2023 | Johnson | B64C 27/006 701/2 |
| 11,868,131 | B2 * | 1/2024 | Zhang | G05D 1/0022 |
| 12,214,877 | B2 * | 2/2025 | Wu | B64C 39/024 |
| 12,235,643 | B2 * | 2/2025 | Zhang | G05D 1/0022 |
| 2010/0250022 | A1 * | 9/2010 | Hines | G05D 1/0044 701/2 |
| 2015/0205301 | A1 * | 7/2015 | Gilmore | G01S 19/13 701/11 |
| 2015/0314870 | A1 * | 11/2015 | Davies | G05D 1/102 701/3 |
| 2015/0367937 | A1 * | 12/2015 | Greenfield | B64C 27/10 701/4 |
| 2016/0070264 | A1 * | 3/2016 | Hu | G05D 1/228 701/2 |
| 2016/0370807 | A1 * | 12/2016 | Gilmore | G01S 19/13 |
| 2017/0029107 | A1 * | 2/2017 | Emami | G01S 13/003 |
| 2017/0069214 | A1 * | 3/2017 | Dupray | G05D 1/104 |
| 2017/0233071 | A1 * | 8/2017 | Pilskalns | G08G 5/34 701/2 |
| 2018/0068567 | A1 * | 3/2018 | Gong | B64C 39/024 |
| 2018/0120829 | A1 * | 5/2018 | Price | B64U 10/13 |
| 2018/0155011 | A1 * | 6/2018 | Greiner | B64C 15/02 |
| 2018/0262674 | A1 * | 9/2018 | Iwakura | B64C 13/20 |
| 2019/0023392 | A1 * | 1/2019 | Micros | B64C 33/02 |
| 2019/0107837 | A1 * | 4/2019 | Yun | G05D 1/0011 |
| 2019/0144116 | A1 * | 5/2019 | Yuan | B64U 10/14 701/3 |
| 2019/0250643 | A1 * | 8/2019 | Takizawa | B64C 13/20 |
| 2019/0265705 | A1 * | 8/2019 | Zhang | G05D 1/0022 |
| 2019/0369648 | A1 | 12/2019 | Fang et al. | |
| 2020/0097026 | A1 * | 3/2020 | Guo | B64U 50/10 |
| 2020/0142432 | A1 * | 5/2020 | Kwak | B60L 50/60 |
| 2020/0174466 | A1 * | 6/2020 | Zhang | G05D 1/0022 |
| 2021/0191390 | A1 * | 6/2021 | Hwang | G05D 1/0022 |
| 2021/0300557 | A1 * | 9/2021 | Oshima | B64F 3/00 |
| 2021/0390867 | A1 * | 12/2021 | Kim | G01C 21/20 |
| 2021/0405655 | A1 * | 12/2021 | Yi | B64F 1/22 |
| 2022/0066456 | A1 * | 3/2022 | Ebrahimi Afrouzi | A47L 9/0477 |
| 2022/0100208 | A1 * | 3/2022 | Karbasi | B60L 50/60 |
| 2022/0163961 | A1 | 5/2022 | Song et al. | |
| 2023/0061934 | A1 * | 3/2023 | Stein | B64U 10/13 |
| 2023/0078803 | A1 * | 3/2023 | Wiegman | G05B 13/04 701/3 |
| 2023/0152822 | A1 * | 5/2023 | Wiegman | B64C 13/04 701/4 |
| 2023/0195112 | A1 * | 6/2023 | Zhang | G05D 1/0022 701/2 |
| 2023/0410662 | A1 * | 12/2023 | Sha | G01S 13/765 |
| 2024/0118705 | A1 * | 4/2024 | Zhang | G05D 1/0022 |
| 2024/0248477 | A1 * | 7/2024 | Weinheber | G05D 1/86 |
| 2024/0310851 | A1 * | 9/2024 | Ebrahimi Afrouzi | G01S 17/87 |
| 2025/0013248 | A1 * | 1/2025 | Zhong | G05D 1/622 |
| 2025/0130596 | A1 * | 4/2025 | Melmoth | G05D 1/245 |

* cited by examiner

DRONE AND OPERATING METHOD THEREOF

CROSS-REFERENCE TO RELATED APPLICATION

This application claims the priority benefit of Taiwan application serial no. 113147565, filed on Dec. 6, 2024. The entirety of the foregoing patent application is hereby incorporated by reference herein and made a part of this specification.

BACKGROUND

Technical Field

The disclosure relates to a drone technology, and in particular, to a drone and an operating method thereof.

Description of Related Art

Currently, drones are commonly used for military purposes. Military units may use drones for reconnaissance or attack missions. Wireless jammers may be configured to interfere with communications of the drone to prevent the drone from performing the mission. When interfered with, the drone may lose communications between the drone and the ground control station (GCS) or communications between the drone and the global navigation satellite system (GNSS). In order to avoid the drone from being damaged, the drone may activate the auto return function. The drone may increase the flight altitude to avoid collision with other objects when returning and may fly in a straight direction toward the base. However, the foregoing method might cause the location of the base to be exposed.

SUMMARY

The disclosure provides a drone and an operating method thereof, which allows the drone to return in a safe manner when communications are interfered with.

A drone of the disclosure includes a transceiver, a storage medium and a processor. The transceiver receives a control signal and a positioning signal. The processor is coupled to the storage medium and the transceiver. The processor is configured to: record a first posture of the drone in the storage medium when the drone moves; determine whether the control signal or the positioning signal is lost; read the first posture from the storage medium and obtain a second posture opposite to the first posture in response to losing the control signal and the positioning signal; operate the drone to move in the second posture.

In an embodiment of the disclosure, the processor is configured to further: determine whether the storage medium stores a reference location in response to losing the control signal but not losing the positioning signal; and operate the drone to move toward the reference location in response to the storage medium storing the reference location.

In an embodiment of the disclosure, the processor is configured to further: determine whether a distance between the drone and the reference location is less than a threshold according to the positioning signal; and enable a wireless channel between the transceiver and a ground control station in response to the distance being less than the threshold.

In an embodiment of the disclosure, the processor is configured to further: determine a state of a first flag in the storage medium; and enable the wireless channel in response to the first flag being in a first state.

In an embodiment of the disclosure, the processor is configured to further: read the first posture from the storage medium and obtain the second posture opposite to the first posture in response to the storage medium not storing the reference location.

In an embodiment of the disclosure, the processor is configured to further perform: determine a state of a second flag in the storage medium in response to losing the control signal and the positioning signal; and read the first posture from the storage medium to obtain the second posture in response to the second flag being in a first state.

In an embodiment of the disclosure, the processor is configured to further: update the state of the second flag to the first state, and operate the drone to hover before the drone is operated to move in the second posture in response to the second flag being in a second state.

In an embodiment of the disclosure, the processor is configured to further: read the first posture to obtain the second posture according to a last in first out principle.

In an embodiment of the disclosure, the storage medium stores multiple postures and multiple time periods respectively corresponding to the multiple postures. The multiple time periods include a first time period corresponding to the first posture. The processor is configured to further: determine whether the first posture is an initial posture among the plurality of postures; and operate the drone to continuously move in the second posture for a second time period, wherein the second time period is greater than the first time period in response to the first posture being the initial posture.

In an embodiment of the disclosure, the processor is configured to further: determine a state of a first flag in the storage medium in response to losing the positioning signal but not losing the control signal; and disable a wireless channel between the transceiver and a ground control station in response to the first flag being in a first state.

In an embodiment of the disclosure, the processor is configured to further: receive a manual control signal through the wireless channel to operate the drone in response to the first flag being in a second state.

In an embodiment of the disclosure, the processor is configured to further: determine a state of a second flag in the storage medium in response to not losing the control signal and the positioning signal; and update the state of the second flag to a second state in response to the second flag being in a first state.

In an embodiment of the disclosure, a source of the control signal is a ground control station.

In an embodiment of the disclosure, a source of the positioning signal is a satellite.

In an embodiment of the disclosure, the processor is configured to further: determine an intensity of the control signal; and determine that the control signal is lost in response to the intensity being less than a threshold.

An operating method of a drone of the disclosure includes: a control signal and a positioning signal are received; a first posture of the drone is recorded in a storage medium of the drone when the drone moves; whether the control signal or the positioning signal is lost is determined; the first posture is read from the storage medium, and a second posture opposite to the first posture is obtained in response to losing the control signal and the positioning signal; the drone is operated to move in the second posture.

In an embodiment of the disclosure, the method further includes: whether the storage medium stores a reference location is determined in response to losing the control signal but not losing the positioning signal; and the drone is operated to move toward the reference location in response to the storage medium storing the reference location.

In an embodiment of the disclosure, the method further includes: whether a distance between the drone and the reference location is less than a threshold is determined according to the positioning signal; and a wireless channel between the drone and a ground control station is enabled in response to the distance being less than the threshold.

In an embodiment of the disclosure, steps of enabling the wireless channel between the drone and the ground control station includes: a state of a first flag is determined in the storage medium; and the wireless channel is enabled in response to the first flag being in a first state.

In an embodiment of the disclosure, the method further includes: the first posture is read from the storage medium, and the second posture opposite to the first posture is obtained in response to the storage medium not storing the reference location.

Based on the above, the drone of the disclosure can perform various return procedures based on different scenarios.

DESCRIPTION OF THE EMBODIMENTS

Figure 1:
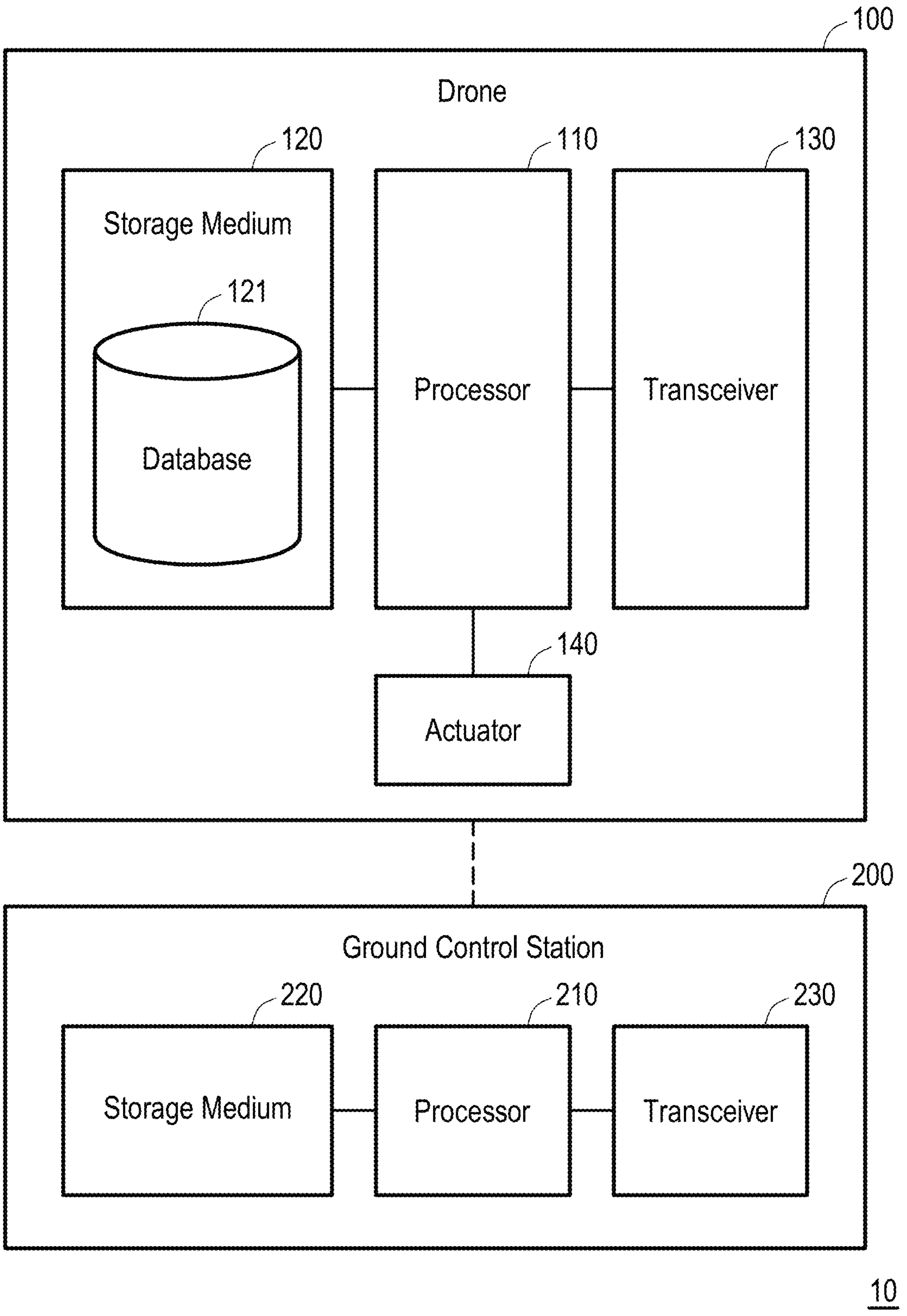
FIG. 1 is a schematic diagram of a drone system according to an embodiment of the disclosure.
Figure 2:
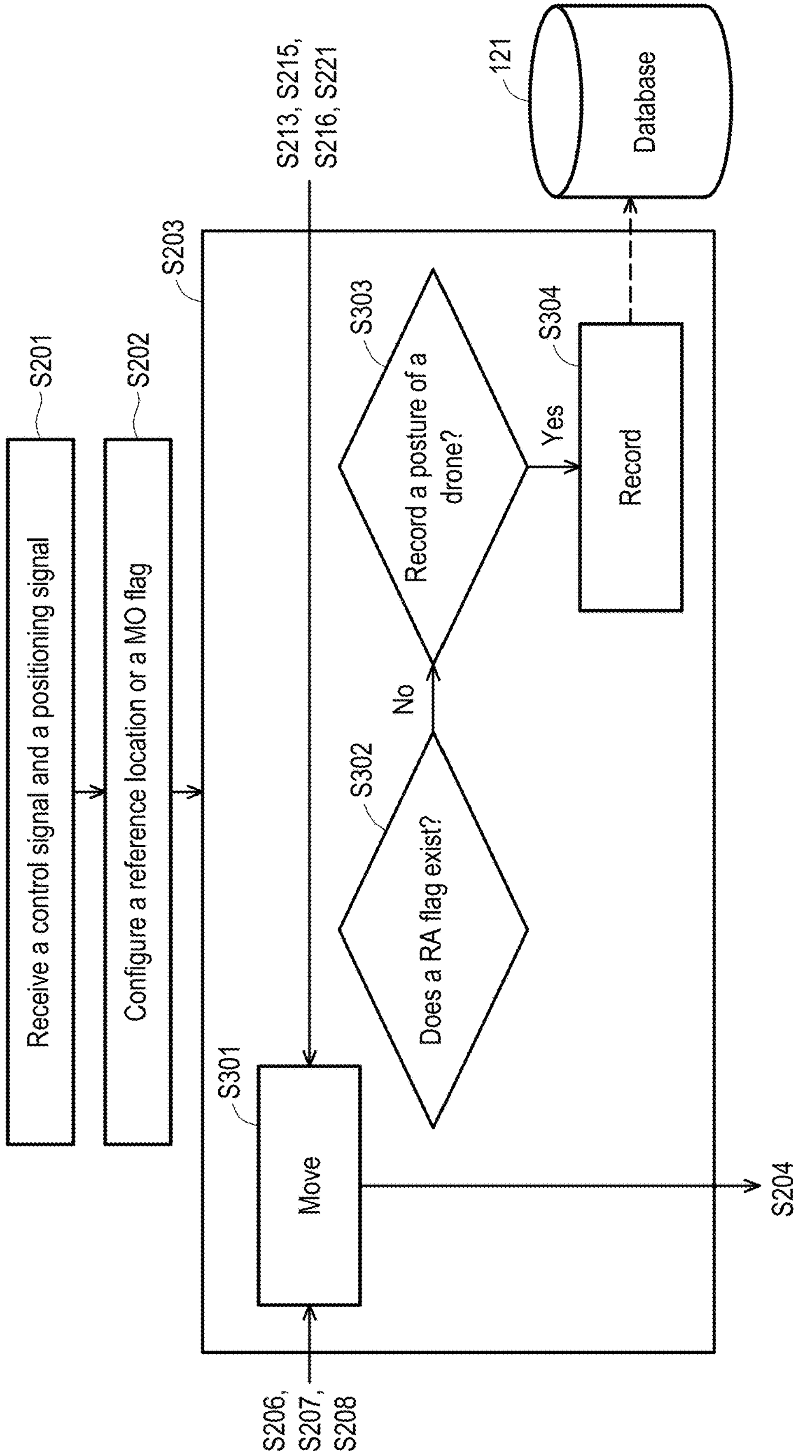
FIG. 2, FIG. 3, FIG. 4 and FIG. 5 are flow charts of an operating method of a drone according to an embodiment of the disclosure.
Figure 3:
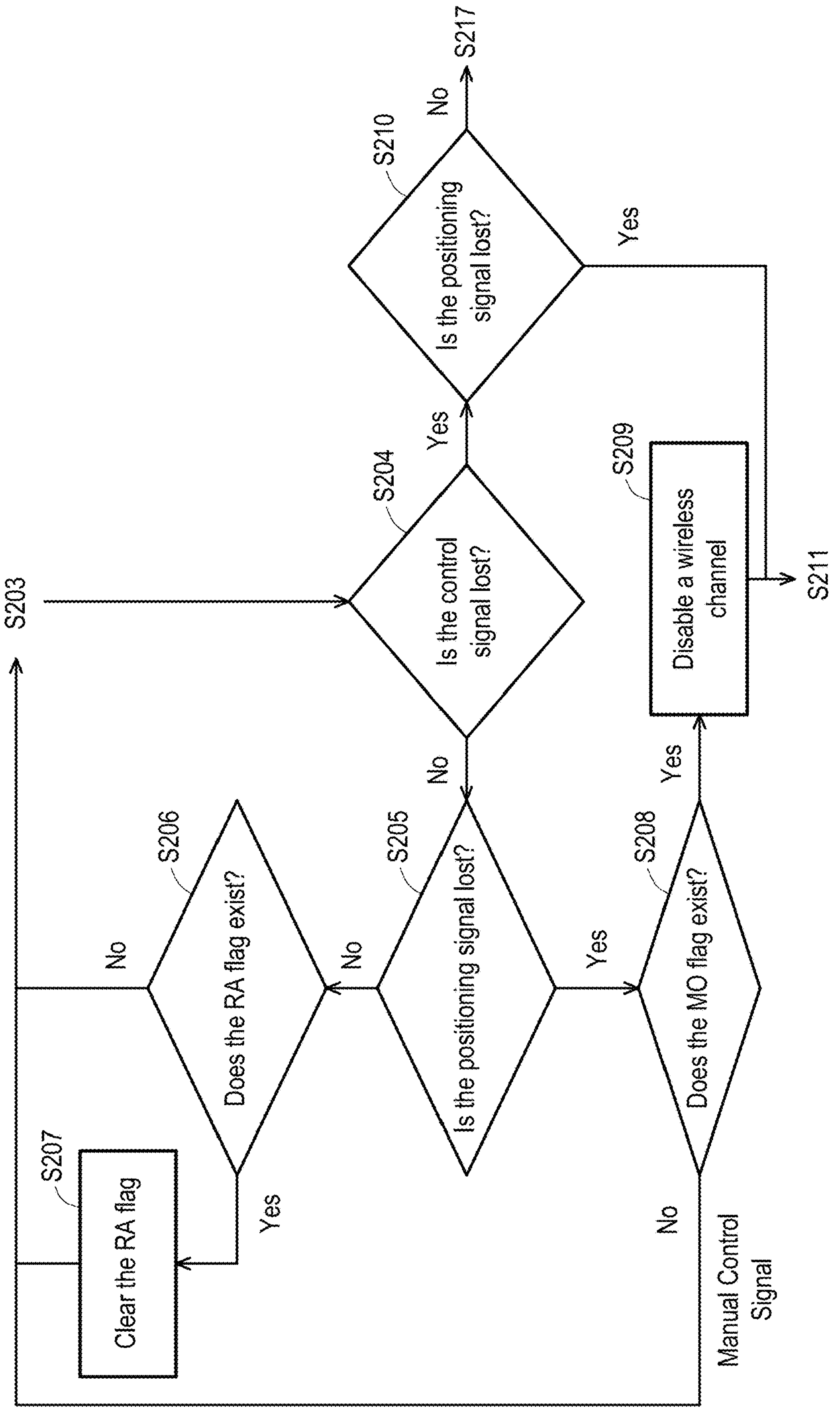
Figure 4:
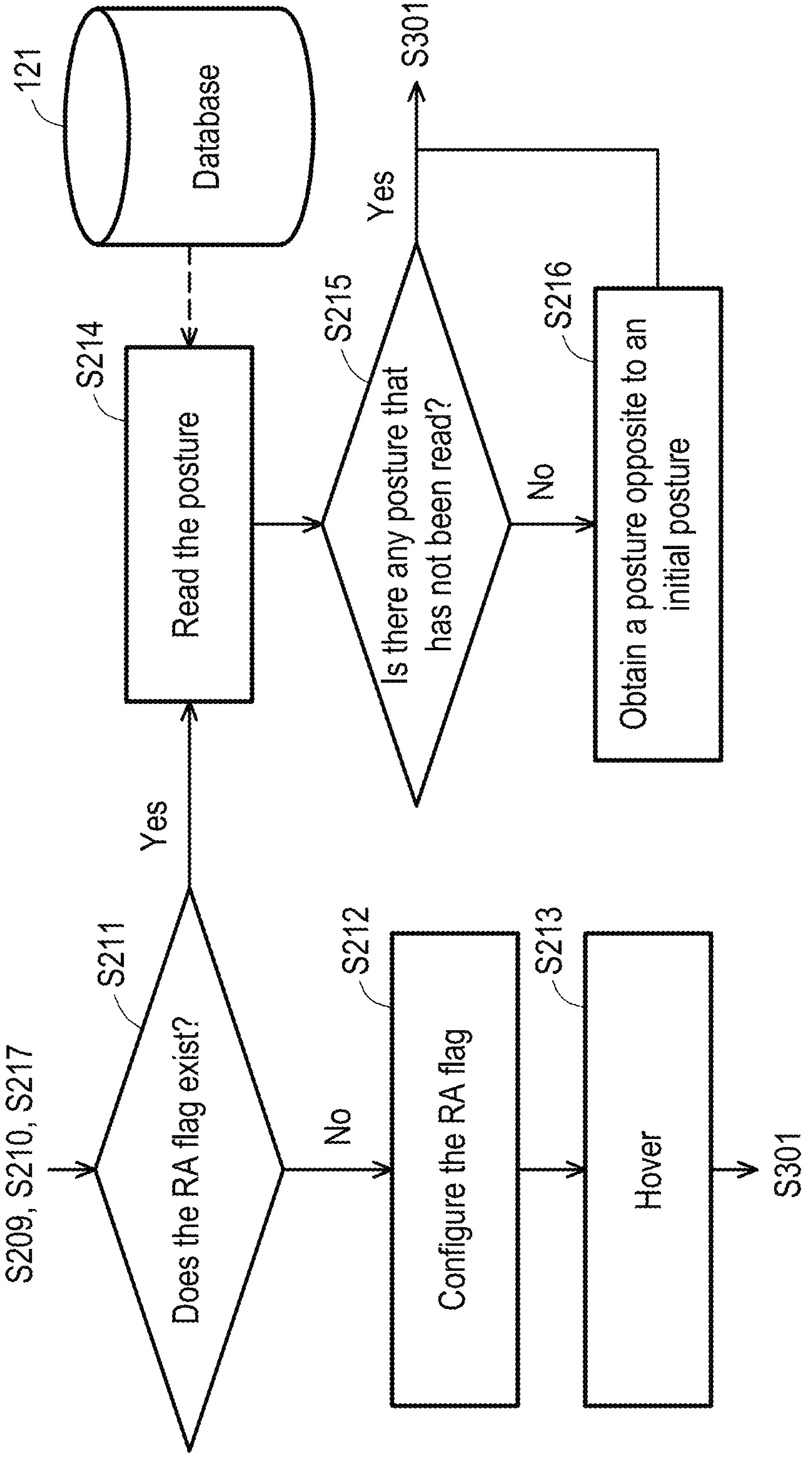
Figure 5:
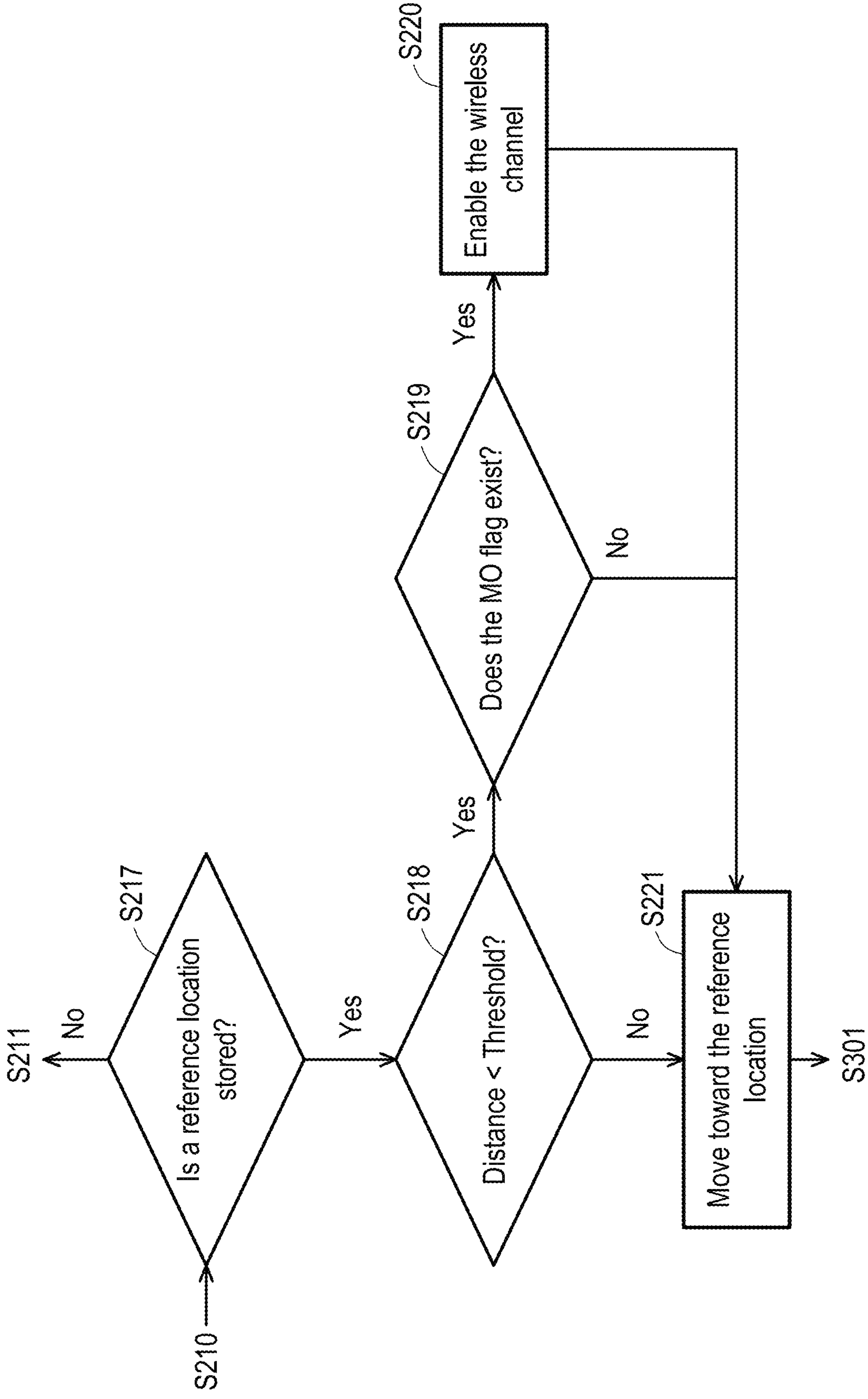

In order to make the content of the disclosure more comprehensible, embodiments in which the disclosure may be implemented are listed as follows. In addition, wherever possible, elements/components/steps with the same reference numerals in the drawings and embodiments represent the same or similar components.

FIG. 1 shows a schematic diagram of a drone system 10 according to an embodiment of the disclosure. The drone system 10 may include a drone 100 and a ground control station 200.

The drone 100 may include a processor 110, a storage medium 120, a transceiver 130 and an actuator 140. The processor 110 is, for example, a central processing unit (CPU), or other programmable general-purpose or special-purpose micro control unit (MCU), microprocessor, digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable gate array (FPGA) or others similar elements or a combination of the foregoing elements. The processor 110 may be coupled to the storage medium 120, the transceiver 130 and the actuator 140, and access and execute multiple modules and various applications stored in the storage medium 120.

The storage medium 120 is, for example, any type of fixed or movable random access memory (RAM), read-only memory (ROM), flash memory, hard disk drive (HDD), solid state drive (SSD) or similar elements or a combination of the foregoing elements, and is configured to store multiple modules or various applications that may be executed by the processor 110. In the embodiment, the storage medium 120 may store a database 121. The database 121 may store a posture of the drone 100 and a time period corresponding to the posture. For example, the database 121 may record the drone 100 flying in a pitch posture of 10 degrees for 10 minutes.

The transceiver 130 transmits or receives signals in a wireless or wired manner. The transceiver 130 may further execute operations such as low noise amplification, impedance matching, mixing, up or down frequency conversion, filtering, amplification, and similar operations. The processor 110 may communicate with the ground control station 200 or a satellite through the transceiver 130, or receive a satellite signal from the satellite. For example, the processor 110 may receive a control signal from the ground control station 200 or a positioning signal from the satellite through the transceiver 130. The positioning signal is, for example, a global positioning system (GPS) signal.

The actuator 140 includes, for example, one or more motors. The processor 110 may drive the drone 100 to fly in a posture such as pitch, roll or yaw by controlling the actuator 140.

The ground control station 200 may include a processor 210, a storage medium 220, and a transceiver 230. The processor 210 is, for example, a CPU, or other programmable general-purpose or special-purpose MCU, microprocessor, digital signal processor DSP, programmable controller, ASIC, GPU, ISP, IPU, ALU, CPLD, FPGA or others similar elements or a combination of the foregoing elements. The processor 210 may be coupled to the storage medium 220 and the transceiver 230, and access and execute multiple modules and various applications stored in the storage medium 220.

The storage medium 220 is, for example, any type of fixed or movable RAM, ROM, flash memory, HDD, SSD or similar elements or a combination of the foregoing elements, and is configured to store multiple modules or various applications that may be executed by the processor 210.

The transceiver 230 transmits or receives signals in a wireless or wired manner. The transceiver 230 may further perform operations such as low noise amplification, impedance matching, mixing, up or down frequency conversion, filtering, amplification, and similar operations. The processor 210 may communicate with the drone 100 or a satellite through the transceiver 230, or receive a satellite signal from the satellite. For example, the processor 210 may send a control signal to the drone 100 through the transceiver 230.

FIG. 2, FIG. 3, FIG. 4 and FIG. 5 are flow charts of an operating method of a drone according to an embodiment of the disclosure. The operating method may be implemented by the drone system 10 shown in FIG. 1.

In step S201, the drone 100 may receive a control signal and a positioning signal through the transceiver 130. The source of the control signal may be the ground control station 200, and the source of the positioning signal may be a satellite.

In step S202, the drone 100 may be selectively configured with a reference location or MO flag. The MO flag is configured to indicate whether the drone 100 is executing a military operation. The MO flag may be configured as an existing state or a clear state. For example, if the MO flag is configured as state "1", it means that the MO flag is in the existing state. If the MO flag is configured as state "0", it means that the MO flag is in the clear state. In an embodiment, a user may operate the ground control station 200 to configure the drone 100 with the reference location or the MO flag. The reference location or the state of the MO flag may be stored in the storage medium 120.

Step S203 may include steps S301, S302, S303 and S304.

In step S301, the drone 100 may move. In an embodiment, the drone 100 may fly autonomously. In another embodiment, the processor 110 may receive a manual control signal from a wireless channel between the drone 100 and the ground control station 200, and may operate the drone to fly according to the manual control signal.

In step S302, the processor 110 may determine whether a RA flag exists. For example, if the RA flag is configured as state "1", it means that the RA flag is in an existing state. If the RA flag is configured as state "0", it means that the RA flag is in a clear state. If the RA flag is configured as "0", step S303 is executed.

In step S303, the processor 110 may determine whether to record a posture of the drone 100. If the processor 110 determines to record the posture of the drone 100, step S304 is executed.

In an embodiment, the processor 110 may determine whether to record the posture of the drone 100 according to a preset command in the storage medium 120. In an embodiment, the processor 110 may receive a command from the ground control station 200 through the transceiver 130, and may determine whether to record the posture of the drone 100 according to the command.

In step S304, the processor 110 may record one or more postures of the drone 100 in the database 121 when the drone 100 moves. In an embodiment, the processor 110 may store multiple postures in the database 121 according to the last in first out (LIFO) principle. The multiple postures stored in database 121 respectively correspond to multiple different time periods. The first posture entered into the database 121 may be defined as an initial posture.

In step S204, the processor 110 may determine whether the control signal is lost. If the control signal is lost, step S210 is executed. If the control signal is not lost, step S205 is executed.

In an embodiment, the processor 110 may determine an intensity of the control signal. If the intensity of the control signal is less than a threshold, the processor 110 may determine that the control signal is lost. If the intensity of the control signal is greater than or equal to the threshold, the processor 110 may determine that the control signal is not lost.

In step S205, the processor 110 may determine whether the positioning signal is lost. If the positioning signal is lost, step S208 is executed. If the positioning signal is not lost, step S206 is executed.

In step S206, the processor 110 may determine whether the RA flag exists. If the RA flag is in the existing state (such as the state of the RA flag is configured as "1"), step S207 is executed. If the RA flag is in the clear state (such as the state of the RA flag is configured as "0"), step S203 is executed again.

In step S207, the processor 110 clears the RA flag in step S207. That is, the processor 110 may change the state of the RA flag from "1" to "0". Next, the processor 110 may re-execute step S203.

In step S208, the processor 110 may determine whether the MO flag exists. If the MO flag is in the existing state, step S209 is executed. If the MO flag is in the clear state, the processor 110 receives a manual control signal through a wireless channel and operates the drone 100 according to the manual control signal. Then, the processor 110 re-executes step S203.

In order to avoid the drone 100 that loses the positioning signal and is in a military operation from being captured by the enemy, in step S209, the processor 110 may disable the wireless channel between the drone 100 and the ground control station 200. Accordingly, the enemy may not be able to obtain relevant information of the ground control station 200 through the drone 100, and the drone 100 may not be able to receive the control signal from the ground control station 200. In an embodiment, before the wireless channel is disabled, the drone 100 may send a message to the ground control station 200 to notify the ground control station 200 to disable the wireless channel.

In step S210, the processor 110 may determine whether the positioning signal is lost. If the positioning signal is lost, step S211 is executed. If the positioning signal is not lost, step S217 is executed.

In step S211, the processor 110 may determine whether the RA flag exists. If the RA flag is in the existing state, step S214 is executed. If the RA flag is in the clear state, step S212 is executed.

In step S212, the processor 110 may configure the RA flag, that is, update the state of the RA flag from state "0" to state "1".

In step S213, the processor 110 may control the actuator 140 to drive the drone 100 to hover to prepare for return. Then, the processor 110 re-executes step S301.

In step S214, the processor 110 may read the posture of the drone 100 from the database 121. In an embodiment, the processor 110 may read the posture of the drone 100 from the database 121 according to the LIFO principle.

In step S215, the processor 110 may determine whether there is any posture that has not been read in the database 121. If there are still unread postures in the database 121, the processor 110 may obtain an opposite posture according to the posture read in step S214 (for example: if the read posture is pitch 10 degrees, the obtained opposite posture may be pitch 190 degrees or pitch minus 170 degrees), and step S301 may be re-executed according to the obtained posture. That is to say, the processor 110 may operate the drone 100 to move according to the obtained posture. On the other hand, if there is no posture that has not been read in the database 121, it means that the posture read in step S214 is an initial posture. Accordingly, the processor 110 may obtain a posture opposite to the initial posture according to the initial posture in step S216. Then, the processor 110 may drive the drone 100 to move according to the obtained posture in step S301. The foregoing steps may allow the drone 100 to return along an original path.

In an embodiment, the processor 110 may move the drone 100 to the rear of an initial location in step S216. Specifically, it is assumed that the drone 100 moves from the initial location in the initial posture for a first time period. After the processor 110 reads the initial posture from the database 121, the processor 110 may obtain the posture opposite to the initial posture. Then, the processor 110 may drive the drone 100 to move in the obtained posture for a second time period. The second time period is greater than the first time period.

In step S217, the processor 110 may determine whether the storage medium 120 stores a reference location. If the storage medium 120 stores the reference location, the processor 110 may drive the drone 100 to move toward the reference location and execute step S218. If the storage medium 120 does not store the reference location, the processor 110 may execute step S211.

In step S218, the processor 110 may determine a distance between the drone 100 and the reference location according to the positioning signal, and determine whether the distance is less than a threshold. If the distance is less than the threshold, step S219 is executed. If the distance is greater than or equal to the threshold, step S221 is executed.

In step S219, the processor 110 may determine whether the MO flag exists. If the MO flag is in the existing state, step S220 is executed. If the MO flag is in the clear state, step S301 is executed.

In step S220, the processor 110 may enable the wireless channel between the transceiver 130 and the ground control station 200. That is to say, the processor 110 may restore the wireless channel between the drone 100 and the ground control station 200 when the drone 100 approaches the reference location. The wireless channel might be turned off in step S209.

In step S221, the processor 110 may drive the drone 100 to move toward the reference location for return. For example, the drone 100 may move in a straight direction toward the reference location.

Figure 6:
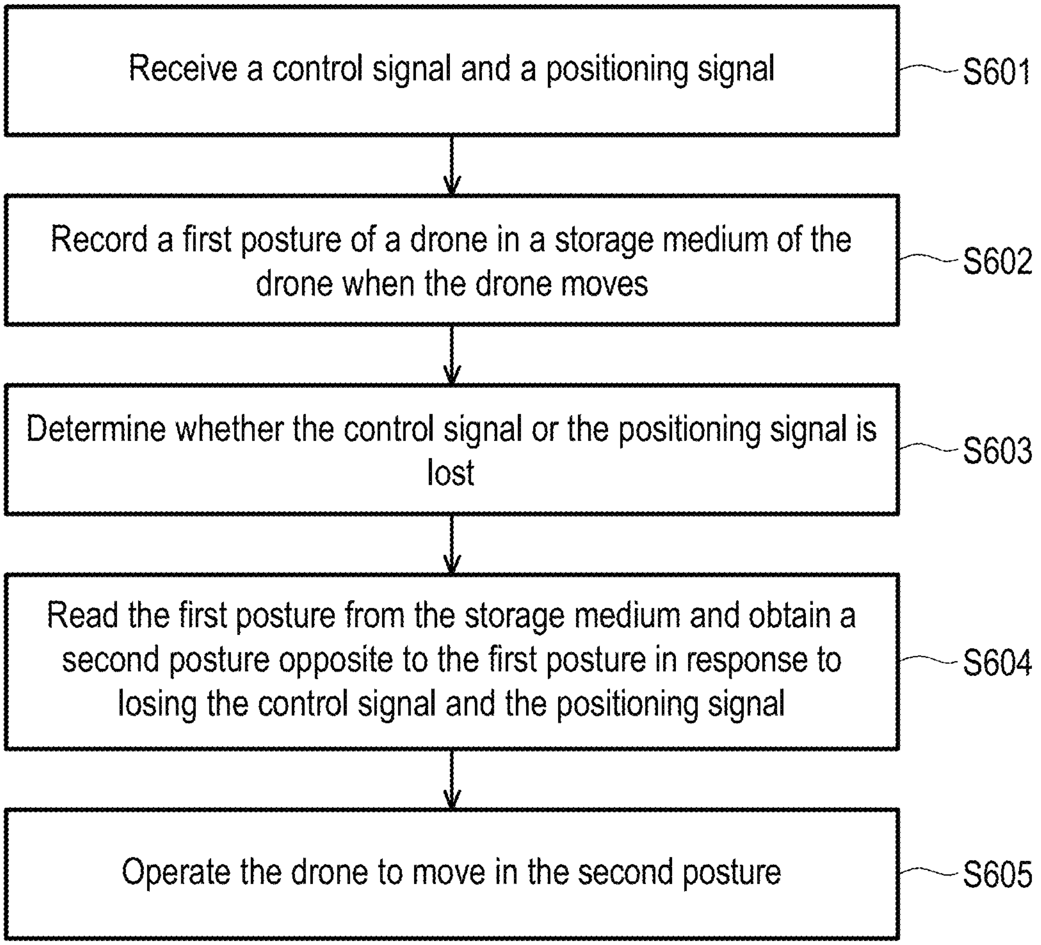
FIG. 6 is a flow chart of an operating method of a drone according to an embodiment of the disclosure.

FIG. 6 is a flow chart of an operating method of a drone according to an embodiment of the disclosure. The method may be implemented by the drone system 10 shown in FIG. 1. In step S601, a control signal and a positioning signal are received. In step S602, a first posture of the drone is recorded in a storage medium of the drone when the drone moves. In step S603, whether the control signal or the positioning signal is lost is determined. In step S604, the first posture is read from the storage medium, and a second posture opposite to the first posture is obtained in response to losing the control signal and the positioning signal. In step S605, the drone is operated to move in the second posture.

In summary, the drone of the disclosure may execute various return procedures based on different scenarios. Suppose the drone loses the control signal or the positioning signal and needs to return. The drone may determine whether the drone is being applied for a military purpose or whether the drone is close to a reference location. The drone may execute functions such as hovering, manual operation, returning along the original path according to the postures previously recorded, or turning on/off the wireless channel based on the scenario in which the drone is in.

What is claimed is:

1. A drone, comprising:

a transceiver, receiving a control signal from a wireless channel between the transceiver and a ground control station and a positioning signal;

a storage medium; and a processor, coupled to the storage medium and the transceiver, wherein the processor is configured to:

record a first posture of the drone in the storage medium when the drone moves;

determine whether the control signal or the positioning signal is lost;

read the first posture from the storage medium and obtain a second posture opposite to the first posture in response to losing the control signal and the positioning signal;

operate the drone to move in the second posture;

determine a state of a first flag in the storage medium in response to losing the positioning signal but not losing the control signal; and notify the ground control station to disable the wireless channel in response to the first flag being in an existing state, wherein the first flag being in the existing state indicates that the drone is in a military operation.

2. The drone according to claim 1, wherein the processor is configured to further:

determine whether the storage medium stores a reference location in response to losing the control signal but not losing the positioning signal; and operate the drone to move toward the reference location in response to the storage medium storing the reference location.

3. The drone according to claim 2, wherein the processor is configured to further:

determine whether a distance between the drone and the reference location is less than a threshold according to the positioning signal; and enable a wireless channel between the transceiver and a ground control station in response to the distance being less than the threshold.

4. The drone according to claim 3, wherein the processor is configured to further:

determine the state of the first flag in the storage medium in response to the distance being less than the threshold; and enable the wireless channel in response to the first flag being in the existing state.

5. The drone according to claim 2, wherein the processor is configured to further:

read the first posture from the storage medium and obtain the second posture opposite to the first posture in response to the storage medium not storing the reference location.

6. The drone according to claim 1, wherein the processor is configured to further:

determine a state of a second flag in the storage medium in response to losing the control signal and the positioning signal; and read the first posture from the storage medium to obtain the second posture in response to the second flag being in an existing state.

7. The drone according to claim 6, wherein the processor is configured to further:

update the state of the second flag to the existing state, and operate the drone to hover before the drone is operated to move in the second posture in response to the second flag being in a clear state.

8. The drone according to claim 1, wherein the processor is configured to further:

read the first posture to obtain the second posture according to a last in first out principle.

9. The drone according to claim 1, wherein the storage medium stores a plurality of postures and a plurality of time periods respectively corresponding to the plurality of postures, wherein the plurality of time periods comprise a first time period corresponding to the first posture, and the processor is configured to further:

determine whether the first posture is an initial posture among the plurality of postures; and operate the drone to continuously move in the second posture for a second time period, wherein the second time period is greater than the first time period in response to the first posture being the initial posture.

10. The drone according to claim 1, wherein the processor is configured to further:

receive a manual control signal through the wireless channel to operate the drone in response to the first flag being in a clear state, wherein the first flag being in the clear state indicates that the drone is not in the military operation.

11. The drone according to claim 1, wherein the processor is configured to further:

determine a state of a second flag in the storage medium in response to not losing the control signal and the positioning signal; and update the state of the second flag to a clear state in response to the second flag being in an existing state a first state.

12. The drone according to claim 1, wherein a source of the control signal is a ground control station.

13. The drone according to claim 1, wherein a source of the positioning signal is a satellite.

14. The drone according to claim 1, wherein the processor is configured to further:

determine an intensity of the control signal; and determine that the control signal is lost in response to the intensity being less than a threshold.

15. An operating method of a drone, comprising:

receiving a control signal from a wireless channel between the drone and a ground control station and a positioning signal;

recording a first posture of the drone in a storage medium of the drone when the drone moves;

determining whether the control signal or the positioning signal is lost;

reading the first posture from the storage medium and obtaining a second posture opposite to the first posture in response to losing the control signal and the positioning signal;

operating the drone to move in the second posture;

determining a state of a first flag in the storage medium in response to losing the positioning signal but not losing the control signal; and notifying the ground control station to disable the wireless channel in response to the first flag being in an existing state, wherein the first flag being in the existing state indicates that the drone is in a military operation.

16. The method according to claim 15, further comprising:

determining whether the storage medium stores a reference location in response to losing the control signal but not losing the positioning signal; and operating the drone to move toward the reference location in response to the storage medium storing the reference location.

17. The method according to claim 16, further comprising:

determining whether a distance between the drone and the reference location is less than a threshold according to the positioning signal; and enabling a wireless channel between the drone and a ground control station in response to the distance being less than the threshold.

18. The method according to claim 17, wherein steps of enabling the wireless channel between the drone and the ground control station comprise:

determine the state of the first flag in the storage medium in response to the distance being less than the threshold; and enable the wireless channel in response to the first flag being in the existing state.

19. The method according to claim 16, further comprising:

reading the first posture from the storage medium, and obtaining the second posture opposite to the first posture in response to the storage medium not storing the reference location.

* * * * *